Sept. 28, 1965   C. S. WHITE   3,208,105
MOLDING PRESS
Filed April 13, 1962   3 Sheets-Sheet 1
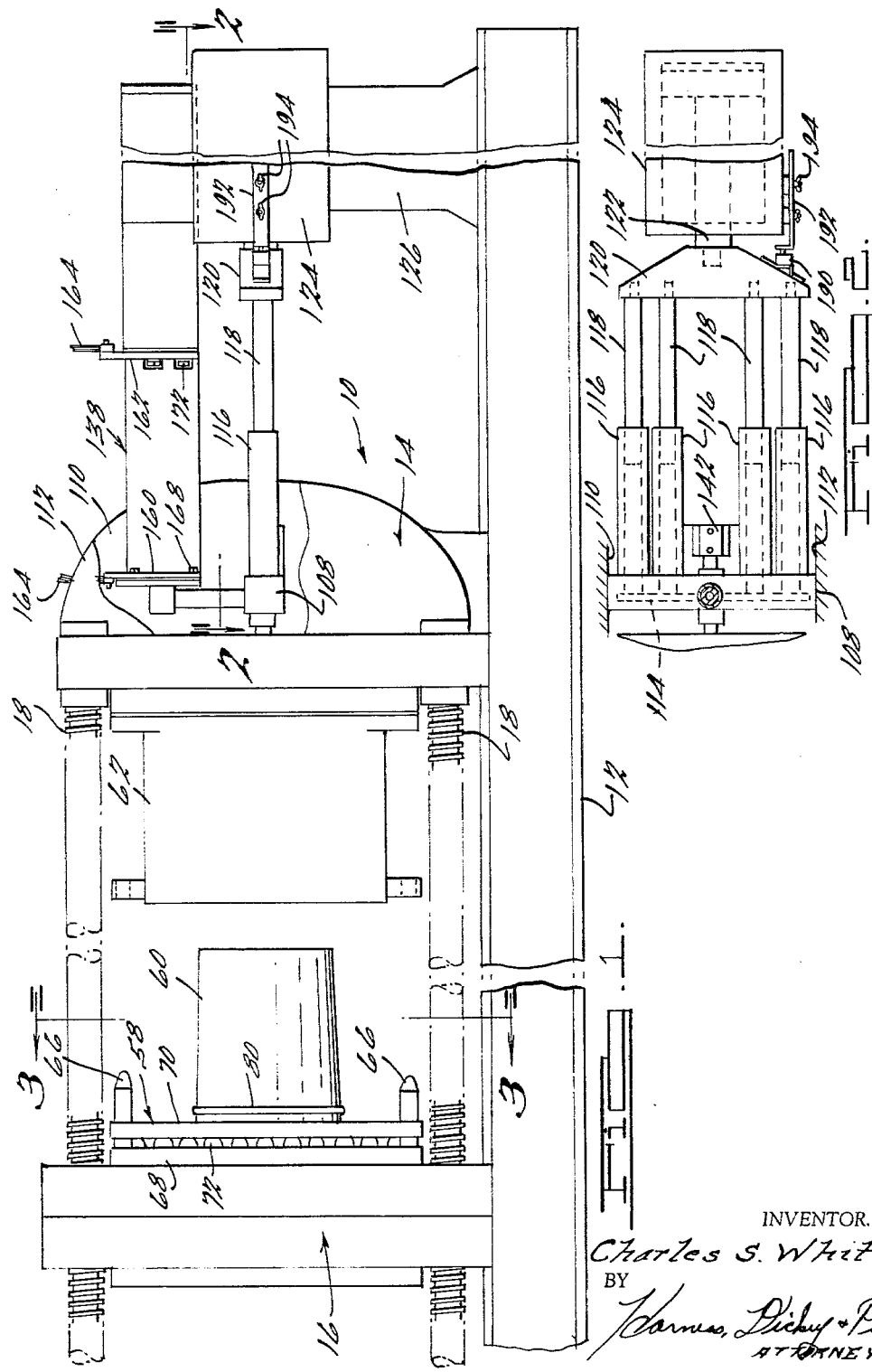
INVENTOR.
Charles S. White.
BY
Barnes, Dickey & Pierce
ATTORNEYS.

Sept. 28, 1965 C. S. WHITE 3,208,105
MOLDING PRESS
Filed April 13, 1962 3 Sheets-Sheet 2
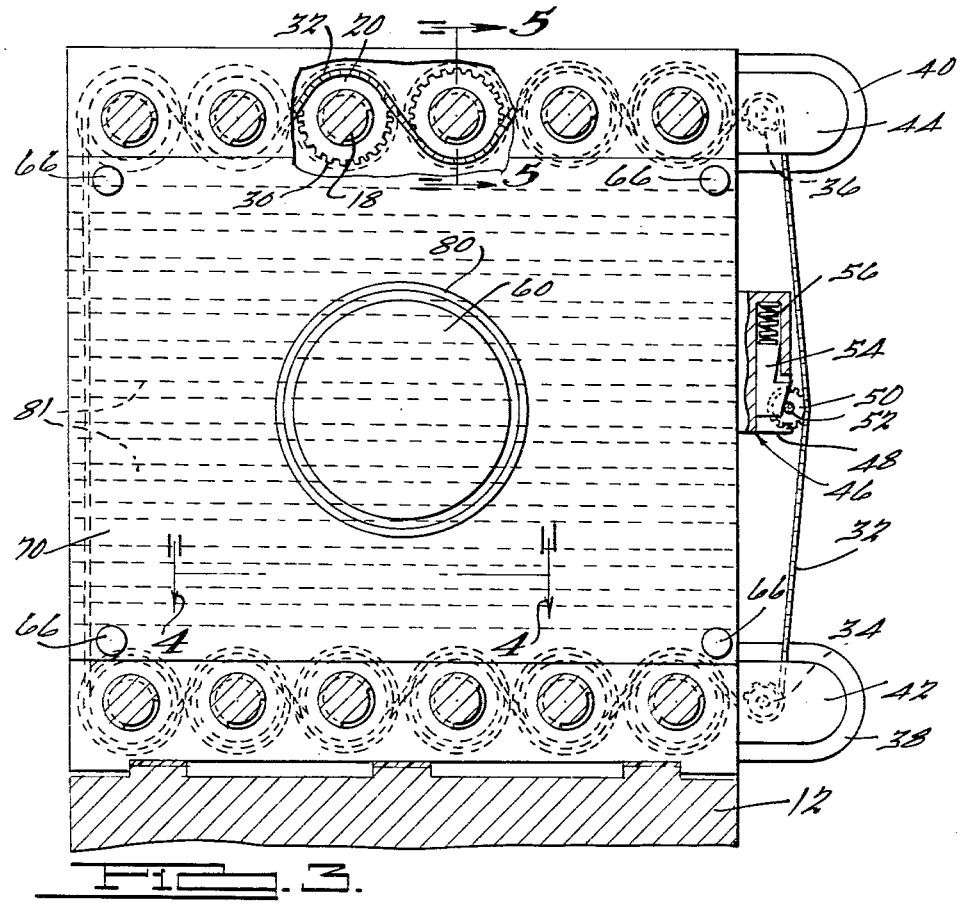
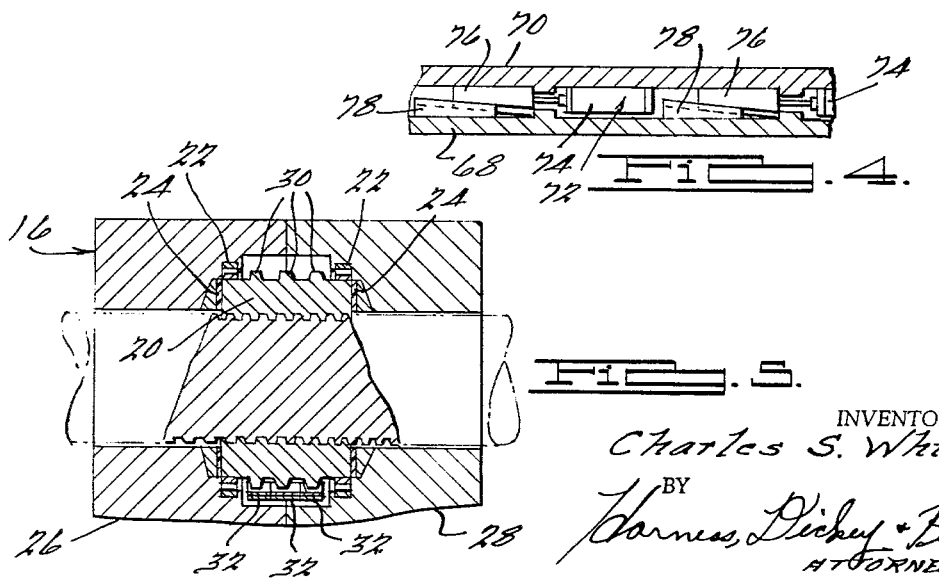
INVENTOR.
Charles S. White.
BY
Harness, Dickey & Pierce
ATTORNEYS.

Sept. 28, 1965 C. S. WHITE 3,208,105
MOLDING PRESS
Filed April 13, 1962 3 Sheets-Sheet 3
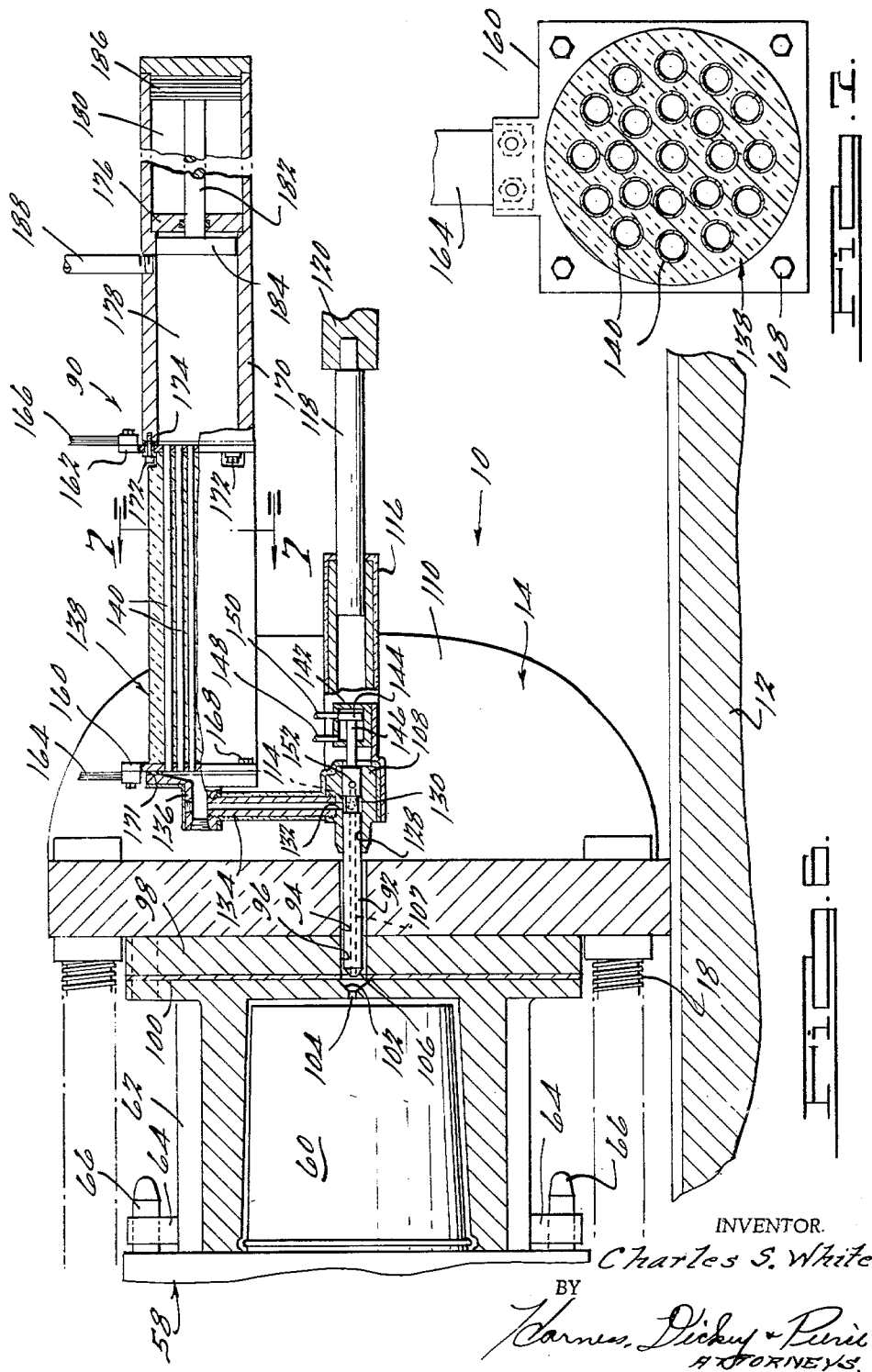
INVENTOR.
Charles S. White
BY
Harness, Dickey & Pierce
ATTORNEYS.

United States Patent Office 3,208,105
Patented Sept. 28, 1965

3,208,105
MOLDING PRESS
Charles S. White, Rte. 3, Box 454-H, Palmdale, Calif.
Filed Apr. 13, 1962, Ser. No. 187,371
9 Claims. (Cl. 18—30)

This invention relates to molding presses and particularly to a press for injection molding plastic materials at exceptionally high pressures.

It is one object of the invention to provide an injection molding press for quickly and efficiently molding thin-walled plastic articles under exceptionaly high pressure to ensure that the plastic material is uniformly and evenly distributed throughout the wall of the molded article.

It is another object of the invention to provide an injection molding press having a multiple lead screw and running nut mechanism for smoothly and evenly moving a platen toward a stationary head to move die elements mounted on the platen and head into assembled relationship.

It is a further object of the invention to provide an injection molding press of the above type having a floating platen assembly on the movable platen which can be actuated by a plurality of cam mechanisms to exert a large force on the die elements after they have been assembled to clamp them together tightly to prevent leakage of plastic material injected under a high pressure into the space between the die elements.

It is a still further object of the invention to provide an injection molding press having an injection apparatus for rapidly heating and injecting a predetermined amount of plastic material at an exceptionally high pressure into the space between assembled die elements to completely and rapidly fill the deep thin-walled sections or large areas to form high quality plastic articles of uniform size and weight.

It is a still further object of the invention to provide an injection molding press that can exert a large clamping force for clamping die elements together, inject plastic material between the die elements at a rapid rate of injection and under high pressure, accurately control the quantity of plastic material injected during each shot, form plastic articles of high quality and uniform in size and weight, and which is far less complicated than prior art injection molding presses of the same capacity.

It is a still further object of the invention to provide an injection molding press which is economical to manufacture, simple in construction and rugged and effective in use.

Other objects and features of novelty of the invention will be specifically pointed out or otherwise become apparent when referring, for a better understanding of the invention, to the following description taken in conjunction with the accompanying drawings wherein:

FIGURE 1 is a broken elevational view of an injection molding press embodying features of the present invention;

FIG. 2 is a view of the structure illustrated in FIG. 1 taken along the line 2—2 thereof;

FIG. 3 is a sectional view of the structure illustrated in FIG. 1 taken along the line 3—3 thereof;

FIG. 4 is a sectional view of the structure illustrated in FIG. 3 taken along the line 4—4 thereof;

FIG. 5 is a sectional view of the structure illustrated in FIG. 3 taken along the line 5—5 thereof;

FIG. 6 is an enlarged sectional view of the upper portion of the structure illustrated in FIG. 1; and FIG. 7 is a sectional view of the structure illustrated in FIG. 6 taken along the line 7—7 thereof.

Referring to FIG. 1, a preferred embodiment of an injection molding press 10 is illustrated which is comprised of a bed 12 having an adjustable head 14 and a movable platen 16 slidably mounted thereon for movement toward and away from one another. The adjustable head 14 is adapted to be fixed at a desired position on the bed and the platen 16 is adapted to be moved toward and away from the adjusted head by a plurality of lead screws 18. The right end of each of the lead screws 18 is fixed to the adjustable head 14 in a manner to prevent axial and rotational movement of the lead screws relative to the head. The left end of each of the lead screws extends through and threadably engages the movable platen 16 and suitable supporting mebers (not shown) may be provided for supporting the left ends of the lead screws on the bed 12.

Referring to FIGS. 3 and 5 in addition to FIG. 1, it will be observed that the left end of each of the lead screws 18 extends through and threadably engages a running nut 20 rotatably journaled in the platen 16 by roller bearings 22 or the like with thrust washers 24 disposed between the platen and the end faces of each nut 20 to reduce friction created by axial loads on the nut. The platen 16 is comprised of two plates 26 and 28 suitably secured together, such as by bolting or the like, so they can be separated to facilitate insertion and removal of the running nuts 20.

Each of the running nuts 20 has three rows of sprocket teeth 30 on the outer periphery thereof, and a conventional endless chain 32 engages each row of the sprocket teeth of each of the running nuts in a manner that describes a sine wave as most clearly illustrated in FIG. 3. Each of the three endless chains 32 also extends over drive sprockets 34 and 36 which are preferably driven by fluid motors 38 and 40 mounted on the platen 16 with speed reducers 42 and 44 connected between the sprockets and motors to reduce the rotational speed of the drive sprockets 34 and 36. A slack take-up mechanism 46 may also be mounted on the movable platen 16 which is comprised of a housing 48 having a roller 50 rotatably mounted on a shaft 52 which is adapted to be cammed outwardly by a wedge 54 urged outwardly by a spring 56 disposed within the housing 48. With this arrangement, the fluid motors will of course drive the three chains 32 in endless fashion which in turn rotates each of the nuts 20 at the same speed to ensure that the movable platen 16 is advanced smoothly and evenly to the right or left as viewed in FIG. 1, depending upon the direction of rotation of the nuts 20.

As most clearly illustrated in FIG. 1, a floating platen assembly 58 is mounted on the right face of the movable platen 16, and a male die element 60 is suitably mounted on the right face of the floating platen 58. A female die element 62 is mounted on the left face of the head 14 in alignment with the male die element so that they can be assembled as illustrated in FIG. 6 when the movable platen 16 is moved to its extreme right-hand position. When assembled in this manner the floating platen assembly abuts against the left end of the female die element 62, and suitable apertured lugs 64 may be secured to the male die element so as to project therefrom to receive dowels 66 projecting from the right face of the floating platen assembly 58 to accurately align the male and female die elements 60 and 62 with one another when in the assembled position illustrated in FIG. 6.

Referring to FIGS. 1 and 4, the floating platen assembly 58 comprises a plate 68 mounted on the movable platen 16 and having the dowels 66 affixed thereto. A floating plate 70 is slidably disposed over the dowels 66 and a plurality of cam mechanisms 72 are disposed between the plates 68 and 70, there being a plurality of cam mechanisms in each of the rows 81 illustrated in dotted lines in FIG. 3. As most clearly illustrated in FIG. 4, each of the cam mechanisms 72 comprises a hydraulic cylinder 74 secured to the floating plate 70 and a pair of wedge mebers 76 and 78. The wedge member 78 is secured to the plate 68 and the wedge meber 76 is connected to the piston of the hydraulic cylinder 74 in a manner to permit it to be shifted laterally from the position illustrated in FIG. 4 to wedge the floating plate 70 upwardly. Suitable low friction material such as Teflon can be disposed on the tapered face of one of the wedge members and also between the movable wedge member 76 and the plate 70 to reduce friction.

With this construction, after the die elements have been assembled as illustrated in FIG. 6 with the floating plate 70 abutting against the left end of the female die element 62, each of the hydraulic cylinders 74 is actuated to shift the wedge members 76 to tightly clamp the floating plate 70 against the left end of the female die element 62 with an extremely large camming force. This ensures a tight seal to enable plastic material to be injected into the space between the die elements under high pressure as will be described. After the plastic material has had an opportunity to harden, the hydraulic cylinders 74 can be reversed to retract the wedge members 76 and the movable platen 16 actuated to withdraw the male die element 60 to the position illustrated in FIG. 1. In the particular die elements illustrated, an annular rib 80 is formed on the male die element and the plastic material is molded over this rib so that it is stripped from the female die 62 upon withdrawal of the male die element 60. The die elements 60 and 62 are adapted to mold a plastic basket or the like, but of course it is apparent that any number of other types of die elements could be used in place of these to mold any number of different types of articles such as bathtubs, boats, wash tubs and so forth.

Referring to FIGS. 1–6 and 7, to inject the plastic material into the space between the assembled die elements an injection apparatus 90 is mounted on the right end of the machine 10 as will be described, and includes a nozzle 92 which slidably extends through aligned apertures 94 and 96 in the head 14 and female die element 62, respectively. Referring to FIG. 6 in particular, it will be observed that the female die element 62 is secured to the adjustable head 14 with a plate 98 disposed therebetween, and that the aperture 96 is actually formed in the plate 98 with a suitable gasket material 100 disposed between the female die element 62 and the plate 98 to ensure a good seal therebetween. A frusto conical seat 102 terminating in a small aperture 104 is formed in the female die element 62 in alignment with the passageways 94 and 96 to enable the frusto conical end 106 of the nozzle 92 to be seated thereagainst when the nozzle is shifted from the position illustrated in FIG. 6 as will be described, so that the plastic material can be forced through a central aperture 107 in the nozzle and aperture 104 into the space between the assembled die elements as will also be described.

The injection apparatus 90 comprises a manifold 108 having the ends thereof suitably supported between sidewalls 110 and 112 of the adjustable head 14. The manifold 108 has a passageway 114 formed therein and a plurality of cylinders 116 secured thereto with the bore of each cylinder communicating with the passageway 114 at spaced points therealong as most clearly illustrated in FIG. 2. A floating piston 118 is slidably disposed in each of the cylinders 116 and the right end of each of the pistons is connected to a yoke 120 so that they can be moved in unison. The yoke 120 is connected to a piston rod 122 of a hydraulic cylinder 124 which is supported on the bed 12 by a supporting member 126.

If desired, both the supporting member 126 and the head 14 can be slidably supported on the bed 12 so that their position can be adjusted relative to one another, or, alternatively, they could be connected to slide together so as to remain at a fixed distance apart from one another. Of course, if the distance between the supporting member 126 and head 14 is varied, the maximum stroke of the pistons 118 and yoke 120 will be changed as will be appreciated from the following description. It is also to be specifically understood that although the head 14 is preferably disclosed herein as being adjustable relative to the bed 12 so that it may be fixed or secured in different positions on the bed, this advantageous adjustable feature could be eliminated by fixing the head 14 to the bed 12 against movement without affecting the remaining operation of the molding press.

As most clearly illustrated in FIG. 6, the nozzle 92 is slidably disposed in a transverse bore 128 of the manifold 108 and an annular groove 130 is formed on the right end of the nozzle 92 so that the nozzle can function in a manner somewhat similar to a spool valve as will be described. A transverse aperture 132 is formed in the center of the manifold 108 in position to communicate with the annular groove 130 when the nozzle 92 is in the position illustrated in FIG. 6, and a suitable pipe 134 is threadably connected to the manifold to communicate with the aperture 132. The upper end of the pipe 134 is threadably connected to a header 136 which is in turn connected to the left end of a cylindrical heating chamber 138 having a plurality of thin-walled tubes 140 therein through which plastic material can be forced as will be described. The header 136 communicates with the left end of each of the tubes 140 and enables plastic material to be passed therethrough into the pipe 134 and then into the manifold 138.

A suitable hydraulic cylinder 142 is mounted on the right side of the manifold 108 and has a piston 144 and rod 146 thereof connected to the right end of the nozzle 92 as illustrated in FIG. 6. Suitable hydraulic conduits 148 and 150 are connected to the cylinder 142 to shift the piston 144 back and forth to shift the nozzle 92 from the retracted position illustrated in FIG. 6 to its injecting position wherein the left end thereof seats firmly against the frusto conical seat 102 in the female die element. When the nozzle 92 is shifted to its injecting position by the piston 144, it seals off the aperture 132 and aligns a transverse aperture 152 in the right end thereof with the passageway 114 in the manifold 108. The transverse aperture 152 communicates with the central aperture 107 of the nozzle and, therefore, when the nozzle 92 is advanced to its injecting position, the pistons 118 can be actuated to force plastic material from the cylinders 116 through the passageway 114 in the manifold 108, through the transverse aperture 152 and central aperture 107 of the nozzle 92 into the space between the die elements as will be described.

Referring to FIGS. 6 and 7, the heating chamber 138 is comprised of a plurality of the thin-walled tubes 140 embedded in a suitable insulating material. The ends of each of the tubes are secured to plates 160 and 162 having apertures therein aligned with the tubes, and the plates are connected to a suitable source of current by leads 164 and 166, respectively, to create a voltage drop across the tubes so that a current will flow therethrough. With this construction the tubes act as resistors and heat up to melt the plastic material disposed therein. The header 136 is connected to the plate 160 by bolts 168 or the like with a suitable layer of insulating material 171 disposed therebetween. A large cylinder 170 is slidably supported on the hydraulic cylinder 124 and suitably secured to the plate 162 by bolts 172, or the like, with a layer of electric insulating material 174 therebetween. A transverse plate 176 is secured within the cylinder 170 to divide it into a first chamber 178 and a second chamber 180, and a piston rod 182 extends slidably through the transverse plate 176 with a piston head 184 on the left end thereof slidably positioned within the chamber 178 and a piston head 186 on the right end thereof slidably positioned with the chamber 180. Suitable hydraulic conduits (not shown) are connected to the cylinder 170 adjacent either end of the chamber 180 to shift the piston head 186 back and forth which, of course, also shifts the piston head 184 back and forth within the chamber 178. A pipe 188 is threadably connected to the cylinder 170 adjacent the right end of the chamber 178 to feed a suitable plastic molding powder into the chamber 178 ahead of the piston head 184 when it is in the position illustrated in FIG. 6 and when piston head 184 is shifted to the left by the introduction of hydraulic fluid under pressure to the right side of the piston head 186, it will force the plastic molding powder into and through the heated tubes 140.

The heat of the tubes 140 and the pressure exerted on the plastic molding powder melt the plastic powder to a flowable state and when the piston head 184 is shifted to the left the plastic material which was previously in the tubes 140 is forced out through the header 136, the pipe 134 and the aperture 132, around the annular groove 130, into the passageway 114 of the manifold 108 as previously described, and into each of the cylinders 116 where it forces the floating pistons 118 to the right to the position illustrated in FIG. 2.

At this point, a suitable limit switch 190 engages the left end of a rod 192 adjustably mounted on the cylinder 124. The limit switch 190 is tripped when it engages the left end of the rod 192 to stop the flow of plastic material by energizing or de-energizing a suitable electric circuit which, in turn, actuates a valve (not shown) to introduce fluid under pressure to the left side of the piston head 184 to return the piston heads 184 and 186 to the position illustrated in FIG. 6. The tripping of the limit switch also shifts the piston 144 within the cylinder 142 to shift the nozzle 92 to the left until the left end thereof seats against the frusto conical seat 102 and the transverse chamber 152 is aligned with the passageway 114. As previously described, when the nozzle 92 is in this injecting position, it seals off the aperture 132. Hydraulic fluid under pressure is then introduced to the hydraulic cylinder 124 to shift the yoke 120 and the pistons 118 to the left to force the plastic material from the cylinders 116 through the passageways 114, 152 and 107 into the space between the die elements under an extremely high pressure that ensures that the plastic material will completely fill the entire space between the die elements.

When the yoke 120 has completed its movement to the left and the injection step is finished, the hydraulic cylinder 142 is reversed to shift the nozzle 92 back to the position illustrated in FIG. 6, and hydraulic fluid under pressure is again introduced into the chamber 180 to shift the piston heads 184 and 186 to the left to force more plastic material from the chamber 178 into the tubes 140, and through the header 136 and the pipe 134 into the manifold 108 and cylinders 116 as described. The pressure of the plastic material again moves the floating pistons 118 to the right until the limit switch 190 on the yoke 120 trips again.

In this manner a predetermined amount of plastic material is injected between the die elements with each forward stroke of the yoke 120 which amount is determined by the point at which the limit switch 190 is tripped by the rod 192. The rod 192 is adjustably mounted on the hydraulic cylinder 124 by wing nuts 194 and can be secured in an adjusted position wherein the left end thereof is in position to engage the limit switch 190 at a different advanced position. With this construction, the limit switch 190 can be tripped at any desired position to halt the movement of the pistons 118 and yoke 120 to the right as viewed in FIG. 2, shift the nozzle 92 to the left and cut off the flow of plastic materail into the manifold 108. In this manner the limit switch 190 and rod 192 co-operate to accurately control the amount of plastic which is injected between the die elements when the yoke 120 is shifted to the left by the hydraulic cylinder 124.

By making the surfaces which contact the plastic material of stainless steel, the machine can be purged of all plastic material remaining therein from prior operations to enable another run to be made utilizing plastic material of another color, for example. Further, to ensure that the plastic material will remain in a flowable state after it has passed through and been heated by the stainless steel tubes 140, the header 138, pipe 134, manifold 108 and cylinders 116 are all encased in a suitable insulating material to reduce the loss of heat.

From the foregoing it will be appreciated that the molding press of the present invention provides an economical simple press for rapidly injecting accurate predetermined quantities of plastic material under high pressure between the die elements 60 and 62. The large piston heads 184 and 186 quickly force the plastic molding powder into the heated tubes 140 which, together with the pressure exerted by the piston heads, quickly heats the powder to a flowable state so that it can be forced into the manifold 108 on the next stroke of the piston heads. The floating pistons, in addition to determining the amount of plastic material to be injected with each shot, co-operate to develop a high pressure for rapidly injecting the plastic material between the die elements. The shiftable nozzle 92 simply and effectively controls the flow of plastic material and the movable platen 16 smoothly and evenly moves the die elements into assembled relation where the floating platen assembly 58 exerts a large clamping force on the die elements to enable the plastic material to be injected therebetween at a high pressure to ensure that it will rapidly fill the deep thin-walled spaces between the elements to rapidly form plastic articles of high quality and uniform in size and weight.

While it will be apparent that the embodiments of the invention herein disclosed are well calculated to fulfill the invention herein disclosed, it will be appreciated that the invention is susceptible to modification, variation and change without departing from the proper scope or fair meaning of the subjoined claims.

What is claimed is:

1. An injection molding press comprising a bed, die element supporting means mounted on said bed for moving a pair of die elements adapted to be supported thereon into and out of assembled relationship, drive means for moving said supporting means for closing said die elements with a substantial pressure, a plurality of fluid actuated wedging elements on said supporting means for applying a substantially greater closing pressure on said die elements after said supporting means has applied said substantial closing pressure therebetween, and injection means for injecting a predetermined amount of material under pressure between the assembled die elements.

2. An injection molding press comprising a bed, a head adapted to support a first die element mounted on said bed, a movable platen adapted to support a second die element for movement toward and away from said head, drive means for moving said platen to move the second die element into clamping relationship with said first die element with a substantial pressure, and a plurality of fluid actuated wedging elements on said platen for adding a substantial pressure to the die elements after said clamping pressure has been applied thereto.

3. An injection molding press comprising a bed, a head mounted on said bed and adapted to support a first die element thereon, a movable platen, means for supporting said platen for movement to and from said head, a floating platen assembly mounted on said movable platen and adapted to support a second die element thereon aligned with the first die element, said floating platen assembly including a plurality of fluid actuated wedging elements exerting a substantial force between said floating and movable platens, drive means for advancing nuts on lead screws for moving said movable platen toward said head to close said die elements with a substantial pressure, and means thereafter for supplying fluid for operating said fluid actuated wedging elements.

4. The invention as defined in claim 3 wherein said floating platen assembly comprises a plate mounted on said movable platen, and a floating plate mounted on said first plate for movement toward and away therefrom and adapted to support the second die element thereon, said wedging means being disposed between said plates.

5. The invention as defined in claim 4 wherein each of said wedging means comprising a wedge member fixed to one of said plates, a movable wedge member slidable between said fixed wedge member and the other of said plates so as to wedge said plates apart, and force-applying means connected to said movable wedge member for sliding it relative to said fixed wedge member and other plate.

6. An injection molding press comprising a bed, a movable platen slidably mounted on said bed, a head for supporting a fixed die element aligned with said platen, a plurality of parallel spaced-apart lead screws extending through said movable platen substantially perpendicular thereto, a plurality of running nuts rotatably journaled in said movable platen against axial movement relative thereto, each running nut threadably engaging a different one of said lead screws, means for fixing said lead screws on said head against rotation and axial movement, rotating means for simultaneously rotating each of said running nuts at the same rate of speed to advance said movable platen toward and from said head, a plate having a closing die element thereon movably secured to said platen, a plurality of wedge means between said platen and plate, and a fluid actuated cylinder on each wedge means for producing its movement for exerting pressure on said die elements in addition to that applied by said running nuts.

7. An injection molding press comprising a bed, a head mounted on said bed and adapted to support a first die element thereon, a movable platen, a plate movably mounted on said platen, a plurality of running nuts rotatably journaled on said platen, fixed lead screws extending through and threadably engaging each of said running nuts, one end of each of said lead screws being fixed to said head to prevent rotation and axial movement of the lead screws relative to the head, said movable place being adapted to support a second die element on the side thereof adjacent said head, drive means for rotating each of said running nuts simultaneously in either direction to slide said movable platen toward and away from said head, and a plurality of fluid actuated wedge elements between said platen and plate for exerting a locking pressure on said movable plate and die elements after the platen has moved the die elements to close position and applied a substantial pressure thereon.

8. In an injection molding press having a fixed die element, a pair of relatively movable plates carrying a second die element which is movable into and out of the assembled relationship with said fixed die element, wedge means between said plates for producing pressure therebetween for further locking said die elements after being moved to closed position, means for moving said plates to close said die elements with a substantial pressure, injection means mounted on said press in position to inject predetermined amounts of heated plastic material between the die elements when in assembled relation, said injection means comprising a manifold mounted on said press, a plurality of cylinders spaced along and communicating with said manifold, a floating piston in each of said cylinders, nozzle means communicating said manifold with the space between the assembled die elements, means for delivering heated plastic material under pressure to said manifold, control means for controlling the flow of the plastic material into said manifold and cylinders, and means for actuating said floating pistons through a predetermined stroke to inject a predetermined amount of plastic material from said cylinders and manifold through said nozzle means and into the space between the die elements with a substantial pressure.

9. In an injection molding press, a bed, a head mounted on said bed for supporting a first die element, a movable platen, a plate movably mounted on said platen, a second die element supported by said plate, drive means for moving said platen toward said head for closing said die elements and exerting a pressure therebetween, a plurality of wedge means between said platen and plate for exerting a locking pressure upon said closing pressure, a manifold mounted on said head, a plurality of cylinders spaced along and communicating with said manifold, a floating piston in each of said cylinders, actuating means mounted on said bed, means for connecting said actuating means to said pistons to simultaneously move the pistons into said cylinders, means for varying the distance between said head and actuating means to vary the maximum stroke of said pistons, nozzle means communicating said manifold with the space between the assembled die elements, and means for delivering predetermined quantities of heated material under substantial pressure to said manifold.

References Cited by the Examiner

UNITED STATES PATENTS

| | | | |
|---|---|---|---|
| 1,898,671 | 2/33 | Lester. | |
| 1,952,241 | 3/34 | Eckert. | |
| 2,111,857 | 3/38 | Jeffery. | |
| 2,319,479 | 5/43 | Ryder | 18—30 |
| 2,366,417 | 1/45 | MacMillin. | |
| 2,370,622 | 3/45 | Gastrow | 18—30 |
| 2,498,264 | 2/50 | Goldhand. | |
| 2,773,536 | 12/56 | Lange | 100—290 |
| 2,807,050 | 9/57 | Roger | 18—30 |
| 2,862,240 | 12/58 | Strauss | 18—30 |
| 2,881,477 | 4/59 | Triulzi | 18—30 |
| 2,916,768 | 12/59 | Quere et al. | 18—30 |
| 2,950,501 | 8/60 | Harkenrider | 18—30 |
| 3,006,032 | 10/61 | Baker et al. | 18—30 |
| 3,036,337 | 5/62 | Burnham | 18—30 |
| 3,071,813 | 1/63 | Lemoine | 18—30 |
| 3,104,433 | 9/63 | Hoern | 18—30 XR |

WILLIAM J. STEPHENSON, *Primary Examiner.*

MICHAEL V. BRINDISI, *Examiner.*